US012791782B2

(12) United States Patent
Sato

(10) Patent No.: US 12,791,782 B2
(45) Date of Patent: Nov. 10, 2026

(54) OPTICAL FIBER

(71) Applicant: FURUKAWA ELECTRIC CO., LTD., Tokyo (JP)

(72) Inventor: Yuki Sato, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 283 days.

(21) Appl. No.: 18/582,996

(22) Filed: Feb. 21, 2024

(65) Prior Publication Data

US 2024/0192437 A1 Jun. 13, 2024

Related U.S. Application Data

(63) Continuation of application No. PCT/JP2022/033951, filed on Sep. 9, 2022.

(30) Foreign Application Priority Data

Sep. 16, 2021 (JP) ................................ 2021-150836

(51) Int. Cl.
*G02B 6/02* (2006.01)
*G02B 6/028* (2006.01)

(52) U.S. Cl.
CPC ..... *G02B 6/02042* (2013.01); *G02B 6/02004* (2013.01); *G02B 6/0285* (2013.01)

(58) Field of Classification Search
None
See application file for complete search history.

(56) References Cited

U.S. PATENT DOCUMENTS 9,057,817 B2 * 6/2015 Bookbinder ......... G02B 6/0286
10,908,353 B2 * 2/2021 Nagano ................ G02B 6/0283
11,506,835 B2 * 11/2022 Hebgen .............. G02B 6/03627
2009/0123122 A1 5/2009 Mukasa
2009/0252470 A1 10/2009 Mukasa
2010/0158460 A1 * 6/2010 Yoon .................. G02B 6/03627 385/124

(Continued)

FOREIGN PATENT DOCUMENTS

JP 2009-122277 A 6/2009
JP 6690296 B2 4/2020

(Continued)

OTHER PUBLICATIONS

International Search Report issued Nov. 8, 2022 in PCT/JP2022/033951 filed on Sep. 9, 2022, 2 pages.

(Continued)

*Primary Examiner* — Jerry Rahll
(74) *Attorney, Agent, or Firm* — Oblon, McClelland, Maier & Neustadt, L.L.P.

(57) ABSTRACT

An optical fiber includes a core portion, a side core layer, and a cladding portion, where Δ1>ΔClad>Δ2 and 0>Δ2 are satisfied, Δ1 is 0.35% or more and 0.45% or less, Δ2 is −0.2% or more and less than 0%, **2*a* is 8 μm or more and 10 μm or less, 2*b*** is 35 μm or more and 45 μm or less, and a refractive index profile of the side core layer includes a bottom portion where a refractive index is lower than that of other regions of the side core layer, and a distance of a position of lowest refractive index in the bottom portion from a center of the core portion is a+(b−a)/1.55 μm or less.

9 Claims, 3 Drawing Sheets

(56) References Cited

U.S. PATENT DOCUMENTS

| | | | | |
|---|---|---|---|---|
| 2017/0371096 | A1 | 12/2017 | Sakuma et al. | |
| 2018/0031761 | A1* | 2/2018 | Bookbinder ....... | G02B 6/03627 |
| 2020/0339465 | A1* | 10/2020 | Kawasaki .......... | G02B 6/03622 |
| 2021/0032153 | A1 | 2/2021 | Chen et al. | |
| 2023/0037687 | A1 | 2/2023 | Kawaguchi et al. | |

FOREIGN PATENT DOCUMENTS

| | | | |
|---|---|---|---|
| WO | WO 2019/142878 | A1 | 7/2019 |
| WO | WO 2021/187475 | A1 | 9/2021 |

OTHER PUBLICATIONS

Extended European Search Report issued Jul. 29, 2025 in European Patent Application No. 22869916.1, 10 pages.

* cited by examiner

OPTICAL FIBER

This application is a continuation of International Application No. PCT/JP2022/033951, filed on Sep. 9, 2022 which claims the benefit of priority of the prior Japanese Patent Application No. 2021-150836, filed on Sep. 16, 2021, the entire contents of which are incorporated herein by reference.

BACKGROUND

The present disclosure relates to optical fibers. In single-mode optical fibers, a technique is disclosed in which dopants such as fluorine are doped into cladding portions to reduce the refractive index of the glass (Japanese Patent No. 6690296). In optical fibers with a reduced refractive index in cladding portions, dopants to be doped in core portions may be reduced or nearly eliminated. As a result, Rayleigh scattering loss caused by the concentration distribution of dopants in the core portions may be reduced to realize optical fibers with ultra-low transmission loss.

Optical fibers employing a W-shaped refractive index profile have also been actively considered (Japanese Patent Publication Laid-open No. 2009-122277). The W-shaped refractive index profile is employed, for example, to increase the effective core area of an optical fiber. Optical fibers with a large effective core area suppress occurrence of nonlinear optical effects in the optical fibers, making them suitable for use as long-distance optical transmission lines, for example. In order to achieve a W-type refractive index profile, for example, dopants that reduce the refractive index of glass, such as fluorine, are doped in a region called side core layer adjacent to the core portion.

SUMMARY

In optical fibers as optical transmission lines, it is more desired to have reduced transmission loss and macrobending loss.

There is a need for optical fibers with reduced transmission loss and macrobending loss.

According to one aspect of the present disclosure, there is provided an optical fiber including: a core portion; a side core layer surrounding a periphery of the core portion; and a cladding portion surrounding a periphery of the side core layer, wherein $\Delta 1>\Delta Clad>\Delta 2$ and $0>\Delta 2$ are satisfied where $\Delta 1$ is an average maximum relative refractive-index difference of the core portion to an average refractive index of the cladding portion, $\Delta 2$ is a relative refractive-index difference of an average refractive index of the side core layer, and $\Delta Clad$ is a relative refractive-index difference of an average refractive index of the cladding portion to pure quartz glass, $\Delta 1$ is 0.35% or more and 0.45% or less, $\Delta 2$ is −0.2% or more and less than 0%, $2a$ is 8 μm or more and 10 μm or less, and $2b$ is 35 μm or more and 45 μm or less where a core diameter of the core portion is $2a$ and an outer diameter of the side core layer is $2b$, a refractive index profile of the side core layer includes a bottom portion where a refractive index is lower than that of other regions of the side core layer, and a distance of a position of lowest refractive index in the bottom portion from a center of the core portion is $a+(b-a)/1.55$ μm or less.

DETAILED DESCRIPTION

Figure 1:
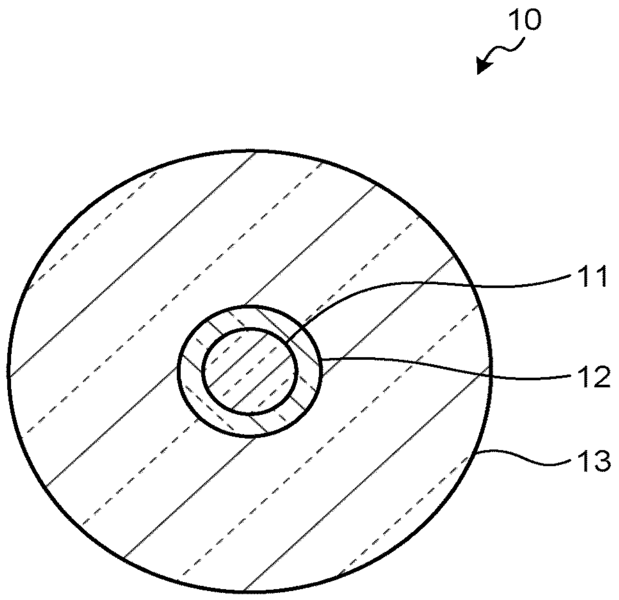
FIG. 1 is a schematic cross-sectional view of an optical fiber according to an embodiment.

The following is a detailed description of an embodiment with reference to the drawings. The present disclosure is not limited by the embodiment described below. In the drawings, identical or corresponding constituent elements are marked with the same symbol as appropriate. In the present specification, cutoff wavelength or effective cutoff wavelength refers to cable cutoff wavelength as defined in ITU-T G. 650.1 of the International Telecommunication Union (ITU). Other terms not specifically defined herein shall follow the definitions and measurement methods in G. 650.1 and G.650.2.

FIG. 1 is a schematic cross-sectional view of an optical fiber according to the embodiment. An optical fiber 10 is made of quartz glass and has a core portion 11, a side core layer 12 surrounding a periphery of the core portion 11, and a cladding portion 13 surrounding a periphery of the side core layer 12. The optical fiber 10 may include a coating layer surrounding a periphery of the cladding portion 13.

Figure 2:
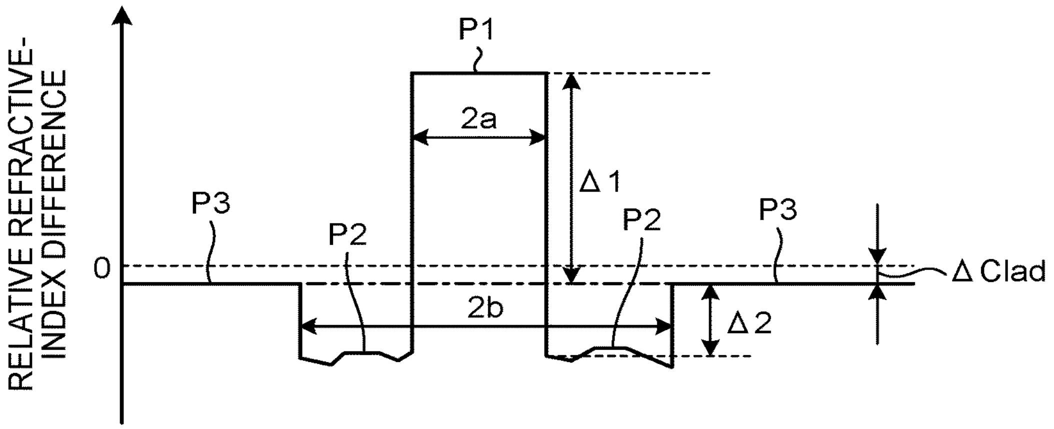
FIG. 2 is a schematic diagram of a refractive index profile of the optical fiber according to the embodiment.

FIG. 2 is a diagram illustrating a refractive index profile of the optical fiber 10. Profile P1 is a refractive index profile of the core portion 11 and has a so-called step type. Profile P2 is a refractive index profile of the side core layer 12. Profile P3 is a refractive index profile of cladding portion 13.

Here, the refractive index profile of the core portion 11 may be not only a geometrically ideal step shape, but also uneven or hemmed from the top due to manufacturing characteristics, instead of being flat at the top. In this case, the refractive index in a region of a core diameter $2a$ of the core portion 11 in the manufacturing design, which is substantially flat at the top of the refractive index profile, serves as an index for determining $\Delta 1$.

Structural parameters of the optical fiber 10 are described below. As mentioned above, the core diameter of the core portion 11 is $2a$. The outer diameter of the side core layer 12 is $2b$.

In addition, $\Delta 1$ is a relative refractive-index difference (maximum relative refractive-index difference) of an average maximum refractive index of the core portion 11 to an average refractive index of the cladding portion 13. $\Delta 2$ is a relative refractive-index difference of an average refractive index of the side core layer 12 to the average refractive index of the cladding portion 13. The average maximum refractive index of the core portion 11 is an average value in a radial direction of the refractive index of the region that is substantially flat at the top of the refractive index profile. The average refractive index of the side core layer 12 and/or the cladding portion 13 is an average value of the refractive index in the radial direction of the refractive index profile.

In addition, ΔClad is a relative refractive-index difference of the average refractive index of the cladding portion 13 to a refractive index of pure quartz glass. Pure quartz glass is extremely high purity quartz glass that contains substantially no dopants that change the refractive index and has a refractive index of approximately 1.444 at a wavelength of 1,550 nm. In FIG. 2, a single-dotted line indicates a relative refractive-index difference of pure quartz glass to the average refractive index of the cladding portion 13. In FIG. 2, a dashed line indicates a line of zero indicating the relative refractive-index difference of pure quartz glass.

For Δ1, Δ2, and ΔClad, relations "Δ1>ΔClad>Δ2" and "0>Δ2" are satisfied. In other words, the optical fiber 10 has a W-shaped refractive index profile. FIG. 2 illustrates the case where ΔClad is less than 0%, but ΔClad may be equal to or greater than 0%.

Materials forming the optical fiber 10 are described below. The core portion 11 is made of quartz glass including dopants for refractive index adjustment. For example, the core portion 11 includes at least one of chlorine (Cl), potassium (K), and sodium (Na) as a dopant. The core portion 11 may further include fluorine (F) added for refractive index adjustment and/or glass viscosity adjustment. F is a dopant that decreases the refractive index of quartz glass, while Cl, K, and Na are dopants that increase the refractive index of quartz glass. The core portion 11 may include germanium (Ge) serving as a dopant that increases the refractive index of quartz glass.

On the other hand, the side core layer 12 and the cladding portion 13 are made of quartz glass with only F and Cl added. By adjusting the refractive index with these dopants, "Δ1>ΔClad>Δ2" and "0>Δ2" are satisfied, and furthermore, suitable example ranges of Δ1, Δ2, and ΔClad, as described below, are realized.

For the structural parameters of the optical fiber 10 according to the present embodiment, for example, Δ1 is 0.35% or more and 0.45% or less, Δ2 is −0.2% or more and less than 0%, 2*a* is 8 μm or more and 10 μm or less, and 2*b* is 35 μm or more and 45 μm or less. This allows the optical fiber to meet at least some of the optical properties specified in, for example, ITU-T G. 652 and G.657. ΔClad is, for example, −0.01%.

For example, the optical fiber 10 has a mode field diameter (MFD) of 8.6 μm or more and 9.5 μm or less at a wavelength of 1,310 nm. For example, the optical fiber 10 has a macrobending loss of 0.03 dB or less at a wavelength of 1,550 nm when wound by 10 turns with a diameter of 30 mm. For example, the optical fiber 10 has a transmission loss of 0.35 dB/km or less at a wavelength of 1,550 nm, in accordance with the provisions of G.652. The transmission loss of the optical fiber 10 at a wavelength of 1,550 nm is further preferred to be 0.2 dB/km or less.

In the optical fiber 10, a MAC value, which is a value obtained by dividing the mode field diameter (MFD) at a wavelength of 1, 310 nm by a cable cutoff wavelength (λcc), is 7.0 or more and 7.2 or less, for example. The MAC value is one of indexes for evaluating macrobending loss characteristics, and optical fibers with similar MAC values have similar macrobending loss characteristics.

In the optical fiber 10, the refractive index profile of the side core layer 12 includes a bottom portion where the refractive index is lower than that of the other regions of the side core layer 12. A distance of a position of the lowest refractive index in the bottom portion from the center of the core portion 11 is "a+(b−a)/1.55 μm" or less.

Figure 4:
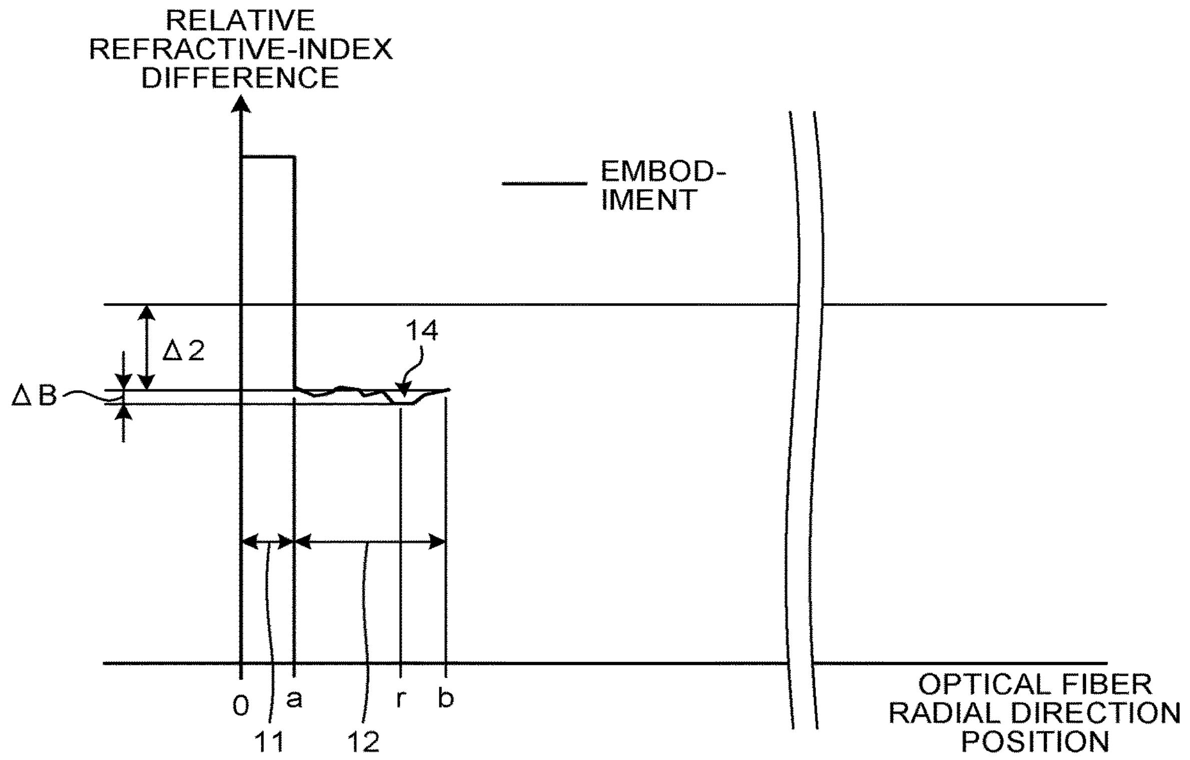
FIG. 4 is a schematic diagram of a key part of the refractive index profile of the optical fiber according to the embodiment.

The bottom portion is described below. FIG. 4 is a schematic diagram of a key part of the refractive index profile of the optical fiber according to the embodiment. In FIG. 4, solid lines indicate the refractive index profiles of the core portion 11 and the side core layer 12 of the optical fiber 10. In the refractive index profile of the side core layer 12 of the optical fiber 10, there is a bottom portion 14 with a lower refractive index than that of the other regions of the side core layer 12. The bottom portion 14 is, for example, a portion in the refractive index profile of the side core layer 12 where the refractive index changes abruptly and where the refractive index profile has an inflection point.

According to the inventors' diligent study, when manufacturing optical fibers adopting a W-type refractive index profile, they fabricated an optical fiber preform using known methods such as Vapor Axial Deposition (VAD) method and Outside Vapor Deposition (OVD) method. When optical fibers were drawn from the optical fiber preform, it was confirmed that, in the refractive index profile of the side core layer 12, there was a bottom portion 14 with a lower refractive index than that of the other regions of the side core layer 12. When ΔB is the relative refractive-index difference of the lowest refractive index of the bottom portion 14 to the average refractive index of the side core layer 12, the absolute value of ΔB is 0.03% or more and 0.07% or less, for example.

Furthermore, with diligent study, the inventors have found that transmission loss and macrobending loss are reduced when the distance of the position of the lowest refractive index in the bottom portion 14 from the center of the core portion 11 (r in FIG. 4) is "a+(b−a)/1.55 μm" or less.

A distance r of "a+(b−a)/1.8 μm" or more is preferred from the viewpoint of ease of manufacture.

Figure 3:
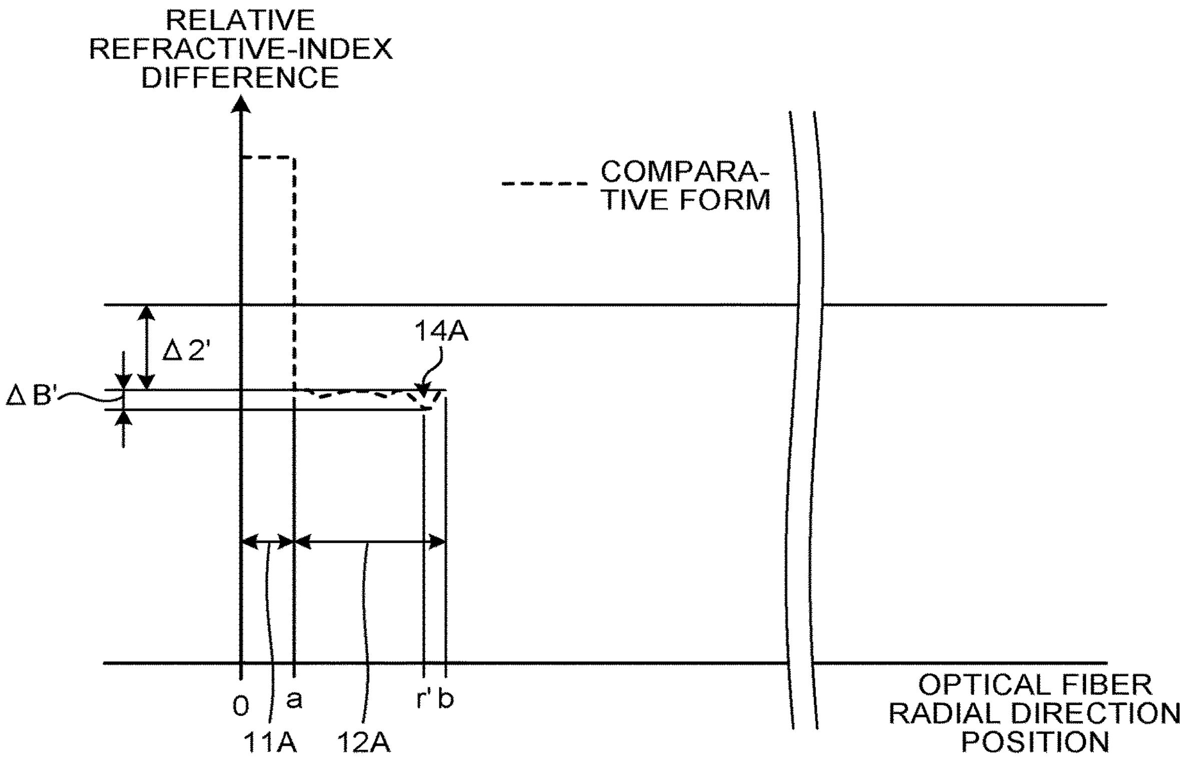
FIG. 3 is a schematic diagram of a key part of a refractive index profile of an optical fiber according to a comparative form.

On the other hand, FIG. 3 is a schematic diagram of a key part of the refractive index profile of the optical fiber according to the comparative form. The optical fiber according to the comparative form is an optical fiber in which only the refractive index profile of the side core layer differs from that of the optical fiber 10 according to the embodiment.

In FIG. 3, the refractive index profiles of a core portion 11A and a side core layer 12A of an optical fiber 10A according to the comparative form are illustrated as dashed lines. Δ2' is a relative refractive-index difference of the average refractive index of the side core layer 12A to an average refractive index of the cladding portion. A bottom portion 14A is also present in the refractive index profile of the side core layer 12A of the optical fiber 10A. The absolute value of a relative refractive-index difference ΔB' of the lowest refractive index of the bottom portion 14A to the average refractive index of the side core layer 12A is, for example, 0.03% or more and 0.07% or less.

However, a distance of a position of the lowest refractive index in the bottom portion 14A from the center of the core portion 11A (r' in FIG. 4) is greater than "a+(b−a)/1.55 μm". In other words, the bottom portion 14A is located relatively close to the cladding portion with respect to the core portion 11A. As a result, the optical fiber 10A is an optical fiber whose transmission loss and macrobending loss are not reduced in comparison with the optical fiber 10.

The results of the inventors' diligent study are further described below. When manufacturing the optical fiber 10A as in the comparative form, the inventors simultaneously formed portions that serve as the core portion and the side core layer of the optical fiber by the VAD method, added fluorine to the side core layer to produce a porous preform, and performed vitrification and sintering to produce a core preform. The core preform may also be prepared by the following method. Specifically, the VAD method is used to fabricate a porous preform with portions that serve as the core portion and side core layer of the optical fiber. Then, fluorine gas is caused to flow through the vitrification and sintering process to dope F into the portion that will become the side core layer of the soot, and a core preform is fabricated. Furthermore, a porous layer that serves as the cladding portion is formed on the fabricated core preform using the OVD method, which is then vitrified and sintered to fabricate the optical fiber preform. An optical fiber is then drawn from the optical fiber preform.

Figure 5:
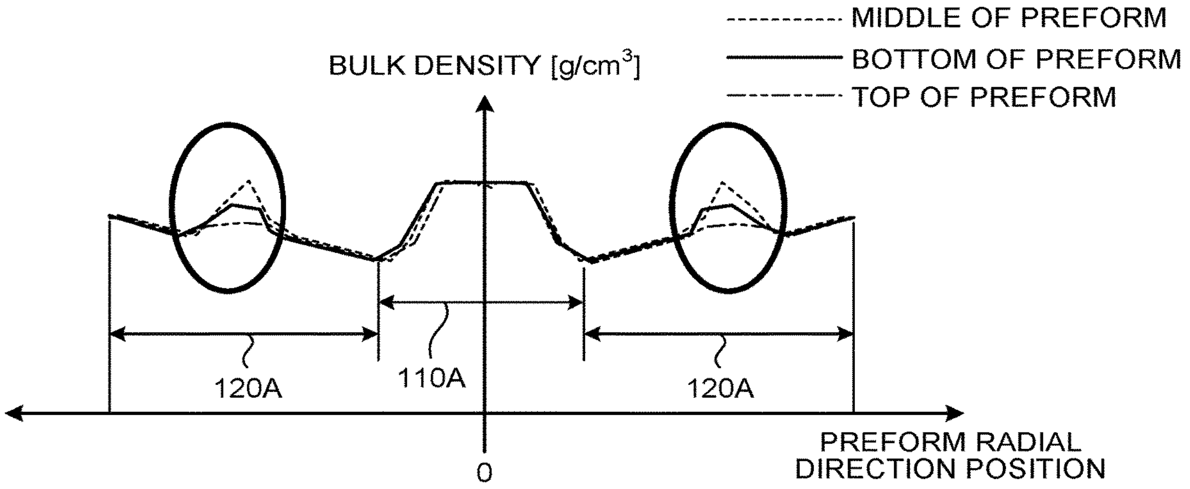
FIG. 5 is a diagram illustrating an example of a bulk density distribution profile of a porous preform used in manufacture of the optical fiber according to the comparative form.

FIG. 5 is a diagram illustrating an example of a bulk density distribution profile of a porous preform used in manufacture of the optical fiber according to the comparative form. A reference numeral 110A is the portion that serves as the core portion 11A, and the reference numeral 120A is the portion that serves as the side core layer 12A. In FIG. 5, the bulk density illustrates distribution profiles at three positions, that is, a top, a middle, and a bottom, in the longitudinal direction of the porous preform.

In the porous preform illustrated in FIG. 5, as circled, there was a local increase in bulk density in the portion 120A and were large variations in bulk density at the top, the middle, and the bottom. Such variations in bulk density and local variations are considered to be the cause of variations in the amount of F doping when F is doped. When such bulk density variations and local variations are large, the bottom portion 14A in the side core layer 12A is located relatively close to the cladding portion.

Therefore, the inventors have made improvements to improve the directivity of flame in a burner used for deposition of glass particles in the VAD method in order to suppress the variations and localized increase in bulk density. Specifically, rectifying plates were installed in the furnace of the VAD system to suppress the airflow that disrupts flame directivity, and the flow rate of combustion aid gas (e.g., oxygen) supplied to the burner was increased to enhance flame directivity.

Figure 6:
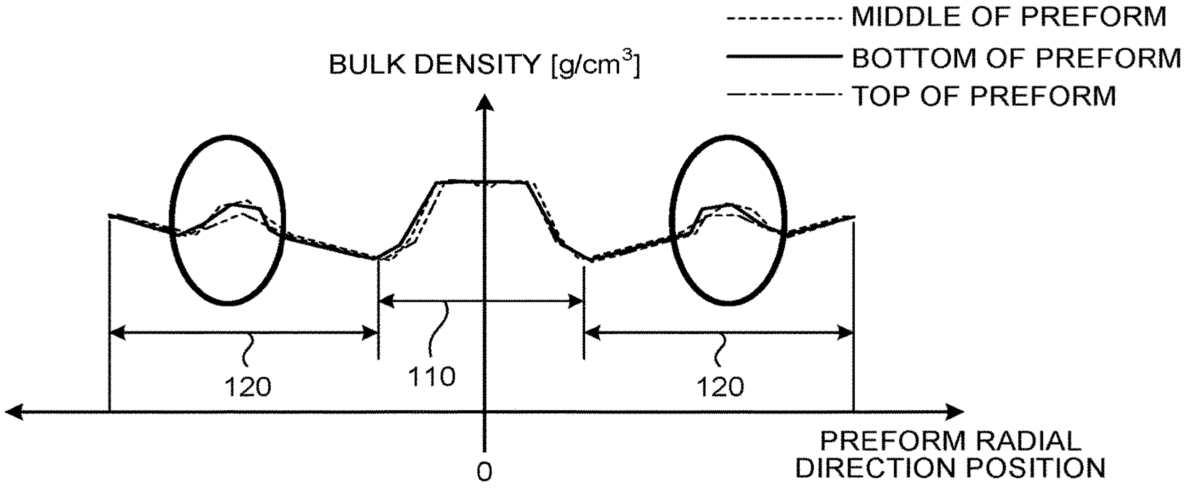
FIG. 6 is a diagram illustrating an example of a bulk density distribution profile of a preform used in manufacture of the optical fiber according to the embodiment.

FIG. 6 is a diagram illustrating an example of a bulk density distribution profile of the preform used in manufacture of the optical fiber according to the embodiment. A reference numeral 110 is a portion that serves as the core portion 11, and a reference numeral 120 is a portion that serves as the side core layer 12. FIG. 6 illustrates distribution profiles of the bulk density at three positions, that is, a top, a middle, and a bottom, in the longitudinal direction of the porous preform.

In the porous preform illustrated in FIG. 6, the variations and local increase in bulk density in the portion 120 were suppressed, as circled. This means that the bottom portion 14 in the optical fiber 10 is located closer to the core portion 11 than the bottom portion 14A in optical fiber 10A, and r is "a+(b−a)/1.55 μm" or less.

EXAMPLES AND COMPARATIVE EXAMPLES

Optical fibers of Examples 1 and 2 and Comparative Examples 1 and 2, corresponding to the embodiment and the comparative form described above, respectively, were manufactured, and their characteristics were measured and evaluated. Table 1 illustrates structural parameters and measurement or evaluation results of the manufactured optical fibers. In the optical fibers of Examples 1 and 2 and Comparative Examples 1 and 2, Q values (MAC values) were all equal and ranged from 7.0 to 7.2. As macrobending loss, macrobending loss was measured at a wavelength of 1,550 nm when the optical fiber was wound by 10 turns with a diameter of 30 mm. The bottom location means a distance of a position of the lowest refractive index in the bottom portion from the center of the core portion (from the core center to the bottom location). The "Rating 1" refers to evaluation of the transmission loss at a wavelength of 1,550 nm, with a value of "○" for a transmission loss of 0.2 dB/km or less and "×" for a transmission loss exceeding 0.2 dB/km. The "Rating 2" refers to evaluation of the macrobending loss. For Example 1 and Comparative Example 1, "○" indicates the case where the macrobending loss is 0.03 dB/km or less, and "×" indicates the case where the macrobending loss is over 0.03 dB/km. For Example 2 and Comparative Example 2, "○" indicates the case where the macrobending loss is 0.5 dB/km or less, and "×" indicates the case where the macrobending loss is over 0.5 dB/km. As may be seen from Table 1-1 and Table 1-2, good results were obtained in Examples 1 and 2 with reduced transmission loss and macrobending loss.

TABLE 1-1

| | 2a (μm) | 2b (μm) | Δ1 (%) | Δ2 (%) | ΔClad (%) |
|---|---|---|---|---|---|
| Example 1 | 8.0 | 38 | 0.4 | −0.15 | −0.01 |
| Comparative Example 1 | 8.0 | 38 | 0.4 | −0.15 | −0.01 |
| Example 2 | 8.5 | 40 | 0.37 | −0.19 | −0.01 |
| Comparative Example 2 | 8.5 | 40 | 0.37 | −0.19 | −0.01 |

TABLE 1-2

| | Distance from core center to bottom location (μm) | ΔB (%) | MFD @1,310 mm (μm) | Q value | Rating 1 | Rating 2 |
|---|---|---|---|---|---|---|
| Example 1 | 12.3 | −0.07 | 8.64 | 7 | ○ | ○ |
| Comparative Example 1 | 14.0 | −0.07 | 8.58 | 7 | X | X |
| Example 2 | 14.4 | −0.03 | 8.97 | 7.1 | ○ | ○ |
| Comparative Example 2 | 18.4 | −0.03 | 9.22 | 7.2 | ○ | X |

Specific values in each of examples are explained below. In Example 1, the core diameter 2*a* was 8 μm. The outer diameter 2*b* of the side core layer was 38 μm. The average maximum relative refractive-index difference Δ1 of the core portion to the average refractive index of the cladding portion was 0.4%. The relative refractive-index difference Δ2 of the average refractive index of the side core layer to the average refractive index of the cladding portion was −0.15%. The relative refractive-index difference ΔClad of the average refractive index of the cladding portion to the refractive index of pure quartz glass was −0.01%. The distance from the core center to the bottom location was 12.3 μm (a+(b−a)/1.55 μm or less). The relative refractive-index difference ΔB of the lowest refractive index of the bottom portion to the average refractive index of the side core layer was −0.07%. And the mode field diameter at a wavelength of 1, 310 nm was 8.64 μm and the Q value was 7.0.

In Comparative Example 1, the core diameter 2*a* was 8 μm. The outer diameter 2*b* of the side core layer was 38 μm. The average maximum relative refractive-index difference Δ1 of the core portion to the average refractive index of the cladding portion was 0.4%. The relative refractive-index difference Δ2 of the average refractive index of the side core layer to the average refractive index of the cladding portion was −0.15%. The relative refractive-index difference ΔClad of the average refractive index of the cladding portion to the refractive index of pure quartz glass was −0.01%. The distance from the core center to the bottom location was 14.0 μm (greater than a+(b−a)/1.55 μm). The relative refractive-index difference ΔB (ΔB') of the lowest refractive index of the bottom portion to the average refractive index of the side core layer was −0.07%. And the mode field diameter at a wavelength of 1,310 nm was 8.58 μm and the Q value was 7.0.

In Example 2, the core diameter 2*a* was 8.5 μm. The outer diameter 2*b* of the side core layer was 40 μm. The average maximum relative refractive-index difference Δ1 of the core portion to the average refractive index of the cladding portion was 0.37%. The relative refractive-index difference Δ2 of the average refractive index of the side core layer to the average refractive index of the cladding portion was −0.19%. The relative refractive-index difference ΔClad of the average refractive index of the cladding portion to the refractive index of pure quartz glass was −0.01%. The distance from the core center to the bottom location was 14.4 μm (a+(b−a)/1.55 μm or less). The relative refractive-index difference ΔB of the lowest refractive index of the bottom portion to the average refractive index of the side core layer was −0.03%. And the mode field diameter at a wavelength of 1, 310 nm was 8.97 μm and the Q value was 7.1.

In Comparative Example 2, the core diameter 2*a* was 8.5 μm. The outer diameter 2*b* of the side core layer was 40 μm. The average maximum relative refractive-index difference Δ1 of the core portion to the average refractive index of the cladding portion was 0.37%. The relative refractive-index difference Δ2 of the average refractive index of the side core layer to the average refractive index of the cladding portion was −0.19%. The relative refractive-index difference ΔClad of the average refractive index of the cladding portion to the refractive index of pure quartz glass was −0.01%. The distance from the core center to the bottom location was 18.4 μm (greater than a+(b−a)/1.55 μm). The relative refractive-index difference ΔB (ΔB') of the lowest refractive index of the bottom portion to the average refractive index of the side core layer was −0.03%. And the mode field diameter at a wavelength of 1, 310 nm was 9.22 μm and the Q value was 7.2.

The present disclosure is suitable for application to optical fibers as optical transmission lines.

The present disclosure has the effect of realizing optical fibers with reduced transmission loss and macrobending loss.

The present disclosure is not limited by the above embodiments. Structures formed of appropriate combinations of the above constituent elements are also included in the present disclosure. Further effects and modifications may be easily derived by those skilled in the art. Thus, broader aspects of the present disclosure are not limited to the above embodiment, but may be modified in various ways.

What is claimed is:

1. An optical fiber comprising:

a core portion;

a side core layer surrounding a periphery of the core portion; and a cladding portion surrounding a periphery of the side core layer, wherein Δ1>ΔClad>Δ2 and 0>Δ2 are satisfied where Δ1 is an average maximum relative refractive-index difference of the core portion to an average refractive index of the cladding portion, Δ2 is a relative refractive-index difference of an average refractive index of the side core layer, and ΔClad is a relative refractive-index difference of an average refractive index of the cladding portion to pure quartz glass, Δ1 is 0.35% or more and 0.45% or less, Δ2 is −0.2% or more and less than 0%,

2*a* is 8 μm or more and 10 μm or less, and 2*b* is 35 μm or more and 45 μm or less where a core diameter of the core portion is 2*a* and an outer diameter of the side core layer is 2*b*, a refractive index profile of the side core layer includes a bottom portion having a locally minimum refractive index, the bottom portion being defined by a refractive index profile including an inflection point, and a distance of a position of lowest refractive index in the bottom portion from a center of the core portion is a+(b−a)/1.55 μm or less.

2. The optical fiber according to claim 1, wherein the bottom portion is a portion in the refractive index profile of the side core layer where the refractive index includes the inflection point and where the refractive index is lower than that of other regions of the side core layer.

3. The optical fiber according to claim 1, wherein an absolute value of ΔB is 0.03% or more and 0.07% or less when ΔB is a relative refractive-index difference of the lowest refractive index of the bottom portion to the average refractive index of the side core layer.

4. The optical fiber according to claim 1, wherein the distance of the position of the lowest refractive index in the bottom portion from the center of the core portion is a+(b−a)/1.8 μm or more.

5. The optical fiber according to claim 1, wherein a mode field diameter at a wavelength of 1,310 nm is 8.6 μm or more and 9.5 μm or less.

6. The optical fiber according to claim 1, wherein a MAC value being a value obtained by dividing a mode field diameter at a wavelength of 1,310 nm by a cable cutoff wavelength is 7.0 or more and 7.2 or less.

7. The optical fiber according to claim 1, wherein the core portion includes at least one of chlorine, potassium, and sodium.

8. The optical fiber according to claim 1, wherein a transmission loss of the optical fiber at a wavelength of 1,550 nm is 0.35 dB/km or less.

9. The optical fiber according to claim 1, wherein a macrobending loss of the optical fiber at a wavelength of 1,550 nm is 0.03 dB or less when the optical fiber is wound by 10 turns with a diameter of 30 mm.

* * * * *